(12) United States Patent
Jeong et al.

(10) Patent No.: US 11,217,798 B2
(45) Date of Patent: Jan. 4, 2022

(54) HOT PRESS DEVICE AND METHOD OF HOT PRESSING MEMBRANE-ELECTRODE ASSEMBLY OF FUEL CELL

(71) Applicants: Hyundai Motor Company, Seoul (KR); Kia Motors Corporation, Seoul (KR)

(72) Inventors: Sung Hoon Jeong, Gyeonggi-do (KR); Jong Cheol Ahn, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 378 days.

(21) Appl. No.: 16/150,246

(22) Filed: Oct. 2, 2018

(65) Prior Publication Data

US 2019/0044164 A1 Feb. 7, 2019

Related U.S. Application Data

(62) Division of application No. 14/945,020, filed on Nov. 18, 2015, now Pat. No. 10,103,393.

(30) Foreign Application Priority Data

Jul. 10, 2015 (KR) .................. 10-2015-0098671

(51) Int. Cl.
*H01M 8/0297* (2016.01)
*B30B 15/00* (2006.01)
*B30B 15/06* (2006.01)

(52) U.S. Cl.
CPC .......... *H01M 8/0297* (2013.01); *B30B 15/00* (2013.01); *B30B 15/0035* (2013.01); *B30B 15/064* (2013.01)

(58) Field of Classification Search
CPC ... B30B 15/00; B30B 15/0035; B30B 15/064; B29C 43/22; B32B 38/1841;
(Continued)

(56) References Cited

U.S. PATENT DOCUMENTS

| 10,103,393 B2 | 10/2018 | Jeong et al. |
| 2007/0116999 A1 | 5/2007 | Kuramochi et al. |
| 2016/0052196 A1 | 2/2016 | Yamada et al. |

FOREIGN PATENT DOCUMENTS

| CN | 101740789 A | 6/2010 |
| CN | 101740792 A | 6/2010 |

(Continued)

OTHER PUBLICATIONS

JP2010146797A—Machine Translation (Year: 2010).*

*Primary Examiner* — Matthew J Daniels
*Assistant Examiner* — Yunju Kim
(74) *Attorney, Agent, or Firm* — Mintz Levin Cohn Ferris Glovsky and Popeo, P.C.; Peter F. Corless

(57) ABSTRACT

A hot press device presses one or more objects to be pressed at a predetermined temperature, and includes: a roller around which a roll on which the objects to be pressed are disposed at predetermined intervals is wound; hot plates which are disposed to face one surface of the objects to be pressed while corresponding to the roll supplied from the roller; press units which are disposed to push the hot plates on the objects to be pressed; and a pitch changing unit which moves the hot plates in a direction in which the roll is moved or in a direction opposite to a direction in which the roll is moved, in accordance with a distance between the objects to be pressed.

3 Claims, 5 Drawing Sheets

(58) Field of Classification Search
CPC .. H01M 8/0297; H01M 4/881; H01M 8/1007; H01M 8/02404; H01M 2008/1095; Y02E 60/50
USPC .......................................................... 264/104
See application file for complete search history.

(56) References Cited

FOREIGN PATENT DOCUMENTS

| | | |
|---|---|---|
| JP | 2010-146797 A | 7/2010 |
| JP | 2010-251136 A | 11/2010 |
| JP | 2014-086132 A | 5/2014 |
| KR | 10-0855191 B1 | 9/2008 |
| KR | 10-2009-0033569 A | 4/2009 |
| KR | 10-2012-0115637 A | 10/2012 |

* cited by examiner

HOT PRESS DEVICE AND METHOD OF HOT PRESSING MEMBRANE-ELECTRODE ASSEMBLY OF FUEL CELL

CROSS-REFERENCE TO RELATED APPLICATION

This Application is a Division of application Ser. No. 14/945,020 filed on Nov. 18, 2015 which claims under 35 U.S.C. § 119(a) the benefit of Korean Patent Application No. 10-2015-0098671 filed in the Korean Intellectual Property Office on Jul. 10, 2015, the entire contents of which are incorporated herein by reference.

BACKGROUND

(a) Field of the Invention

The present invention relates to a hot press device and a method of hot pressing a membrane-electrode assembly (MEA) including an electrolyte membrane, an electrode, and a sub-gasket.

(b) Description of the Related Art

It is known that a fuel cell generates electricity through an electrochemical reaction of hydrogen and oxygen. A fuel cell can consistently generate electricity by being supplied with chemical reactants from the outside without a separate charging process.

A fuel cell may be constructed such that separators (separating plates or bipolar plates) are disposed at both sides of a membrane-electrode assembly (MEA) interposed between the separators.

Here, the membrane-electrode assembly has an anode layer formed on one surface of the electrolyte membrane, and a cathode layer formed on the other surface of the electrolyte membrane, and the electrolyte membrane is disposed between the anode layer and the cathode layer. Further, the membrane-electrode assembly has a sub-gasket which opens the anode layer and the cathode layer and is bonded to both edge portions of the electrolyte membrane.

An automated system, which automatically implements the entire process from a process of bonding the membrane-electrode assembly made in the form of a roll to a pinching process, has been disclosed. In particular, the membrane-electrode assembly may be loaded to a bonding press, and the bonding press bonds the electrolyte membrane and the electrode at a high temperature and under high pressure.

Meanwhile, the membrane-electrode assembly in the form of a single long roll undergoes a hot press process. However, a distance between the membrane-electrode assemblies on the single roll varies, and as a result, precision of the hot press process may deteriorate.

The above information disclosed in this Background section is only for enhancement of understanding of the background of the invention and therefore it may contain information that does not form the prior art that is already known in this country to a person of ordinary skill in the art.

SUMMARY

The present invention provides a hot press device and a hot press method, which are capable of precisely performing a hot press process in a state in which a distance between membrane-electrode assemblies arranged on a membrane-electrode assembly (MEA) roll varies, thereby improving productivity of a fuel cell.

An exemplary embodiment of the present invention provides a hot press device which presses one or more objects to be pressed at a predetermined temperature, the hot press device including: a roller around which a roll on which the objects to be pressed are disposed at predetermined intervals is wound; hot plates which are disposed to face one surface of the objects to be pressed while corresponding to the roll supplied from the roller; press units which are disposed to push the hot plates on the objects to be pressed; and a pitch changing unit which moves the hot plates in a direction in which the roll is moved or in a direction opposite to a direction in which the roll is moved, in accordance with a distance between the objects to be pressed.

The objects to be pressed may be membrane-electrode assemblies, and the roll may be an MEA roll.

The hot plates may include first, second, and third hot plates that are disposed at predetermined intervals in a direction in which the membrane-electrode assemblies are arranged, and the pitch changing unit may move at least one of the first, second, and third hot plates forward or rearward.

The pitch changing unit may move the first hot plate forward or rearward on the basis of the second hot plate.

The pitch changing unit may move the third hot plate forward or rearward on the basis of the second hot plate.

The second hot plate may be fixed, and the first and third hot plates may be disposed to be moved forward or rearward.

The first, second, and third hot plates may be disposed at upper and lower sides so as to correspond to both surfaces of the membrane-electrode assemblies, respectively.

The pitch changing unit may include: a servo motor; a screw which is disposed to be rotated by the servo motor; and a moving block which is fastened to the screw, and disposed to be moved in both directions depending on a rotation direction of the screw, and at least one of the first, second, and third hot plates may be disposed to be moved in both directions together with the moving block.

The hot press device may further include: a pitch detecting unit which detects a pitch between the membrane-electrode assemblies disposed on the MEA roll; and a control unit which controls the pitch changing unit based on the pitch between the membrane-electrode assemblies which is detected by the pitch detecting unit.

The hot press device may further include: an unwinder roller which rotates to supply the wound MEA roll to the hot press device; and a rewinder roller which rotates to wind the MEA roll to unload the MEA roll from the hot press device.

A soft film may be fixedly disposed on one surface of at least one of the first, second, and third hot plates so as to face the membrane-electrode assembly, and the soft film may have a protruding portion formed to correspond to a shape of the membrane-electrode assembly.

The press unit may include: a moving frame which is disposed to face one surface of the MEA roll; and a cylinder which pushes the moving frame on the membrane-electrode assembly, and the moving block may be slidably connected to the moving frame.

Another exemplary embodiment of the present invention provides a hot press method including: adjusting positions of hot plates, which press objects to be pressed at a predetermined temperature, in accordance with an interval between the objects to be pressed; pressing the hot plates on both surfaces of the objects to be pressed using predetermined force; and separating the hot plates pressed on the objects to be pressed.

The objects to be pressed may be arranged on a roll at predetermined intervals, and the roll may be loaded between the hot plates.

The objects to be pressed may be membrane-electrode assemblies, and the roll may be an MEA roll.

The hot plates may include first, second, and third hot plates disposed at predetermined intervals in a direction in which the membrane-electrode assemblies are arranged, and in the adjusting of the positions of the hot plates, at least one of the first, second, and third hot plates may be moved forward or rearward.

In the adjusting of the positions of the hot plates, the second hot plate may be fixed, and the first and third hot plates may be moved forward or rearward.

In the exemplary embodiment of the present invention, the positions of the hot plates are adjusted in accordance with the pitch between the membrane-electrode assemblies disposed on the MEA roll, thereby more precisely hot pressing the membrane-electrode assembly using the hot plates.

BRIEF DESCRIPTION OF THE DRAWINGS

The drawings are intended to be used as references for describing the exemplary embodiments of the present invention, and the accompanying drawings should not be construed as limiting the technical spirit of the present invention.

DETAILED DESCRIPTION OF THE EMBODIMENTS

Figure 1:
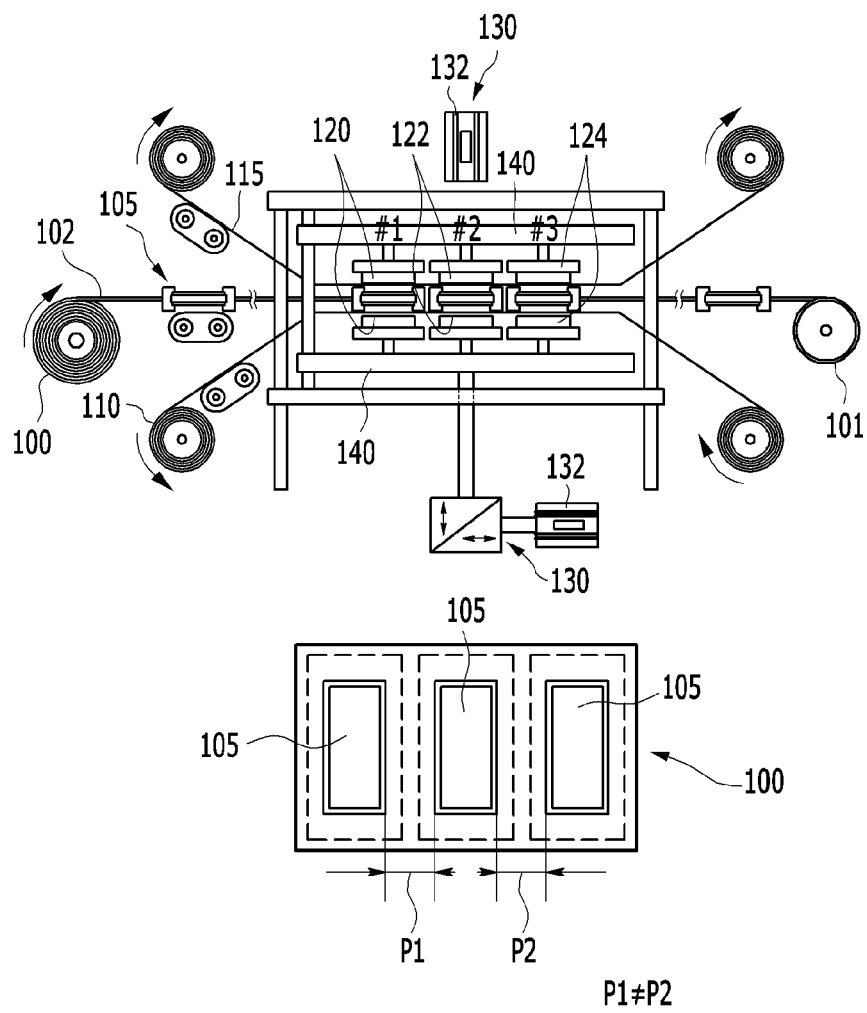
FIG. 1 is a configuration view of an apparatus for manufacturing fuel cell stack components associated with the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof. A part irrelevant to the description will be omitted to clearly describe the present invention, and the same or similar constituent elements will be designated by the same reference numerals throughout the specification.

The size and thickness of each component illustrated in the drawings are arbitrarily shown for understanding and ease of description, but the present invention is not limited thereto. Thicknesses of several portions and regions are enlarged for clear expressions.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

FIG. 1 is a configuration view of an apparatus for manufacturing fuel cell stack components associated with the present invention.

Referring to FIG. 1, the apparatus for manufacturing fuel cell stack components includes an unwinder roller 100, an MEA roll 102, membrane-electrode assemblies 105, protective films 115, protective film rollers 110, first hot plates 120, second hot plates 122, press units 130, cylinders 132, pressing frames 140, third hot plates 124, and a rewinder roller 101.

The membrane-electrode assemblies 105 are disposed on the MEA roll 102, intervals between the respective membrane-electrode assemblies 105 may be the same, or the respective membrane-electrode assemblies 105 may be non-uniformly disposed with a first pitch P1 and a second pitch P2.

The MEA roll 102 is wound around the unwinder roller 100, and the MEA roll 102 wound around the unwinder roller 100 is unwound and then rewound around the rewinder roller 101.

The first, second, and third hot plates 120, 122, and 124 are disposed at upper and lower sides of the MEA roll 102 so as to face each other, respectively, and the first, second, and third hot plates 120, 122, and 124 are moved upward and downward by the pressing frames 140, thereby hot pressing the membrane-electrode assemblies 105.

Further, the MEA roll 102, which moves from the unwinder roller 100 to the rewinder roller 101, passes through the first hot plates 120, the second hot plates 122, and the third hot plates 124.

The pressing frames 140 are moved upward and downward by the press units 130, and the press units 130 include the cylinders 132 that move the pressing frames 140 upward and downward. The cylinders 132 may be driven by hydraulic pressure.

The protective film 115 is supplied from the protective film roller 110 to a portion between the MEA roll 102 and the first, second, and third hot plates 120, 122, and 124 that are disposed at the upper side of the MEA roll 102, and the protective film 115 is supplied from the protective film roller 110 to a portion between the MEA roll 102 and the first, second, and third hot plates 120, 122, and 124 that are disposed at the lower side of the MEA roll 102.

Figure 2:
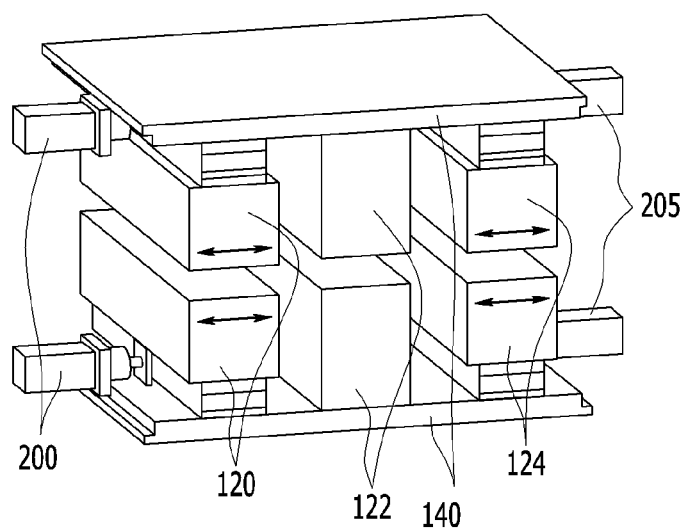
FIG. 2 is a partial configuration view of the apparatus for manufacturing fuel cell stack components according to an exemplary embodiment of the present invention.

FIG. 2 is a partial configuration view of the apparatus for manufacturing fuel cell stack components according to an exemplary embodiment of the present invention.

Referring to FIG. 2, the first hot plates 120, the second hot plates 122, and the third hot plates 124 are disposed at the upper and lower sides, respectively, the MEA roll 102 passes between the first, second, and third hot plates 120, 122, and 124, and the first, second, and third hot plates 120, 122, and 124 are disposed on the pressing frames 140 in order to hot press the membrane-electrode assemblies 105, respectively.

In the exemplary embodiment of the present invention, the second hot plates 122, which are disposed between the first and third hot plates 120 and 124, are fixed to the pressing frames 140, and the first and third hot plates 120 and 124 are disposed to be movable by a predetermined distance in a movement direction of the MEA roll 102.

First variable pitch servo motors 200 may adjust a distance from the second hot plates 122 by pulling or pushing the first hot plates 120, and second variable pitch servo motors 205 may adjust a distance from the second hot plates 122 by pulling and pushing the third hot plates 124.

Therefore, even though the membrane-electrode assemblies 105 are arranged on the MEA roll 102 with non-uniform pitches, positions of the first and third hot plates 120 and 124 are changed on the basis of the second hot plates 122, thereby more precisely performing a hot pressing process.

Figure 3:
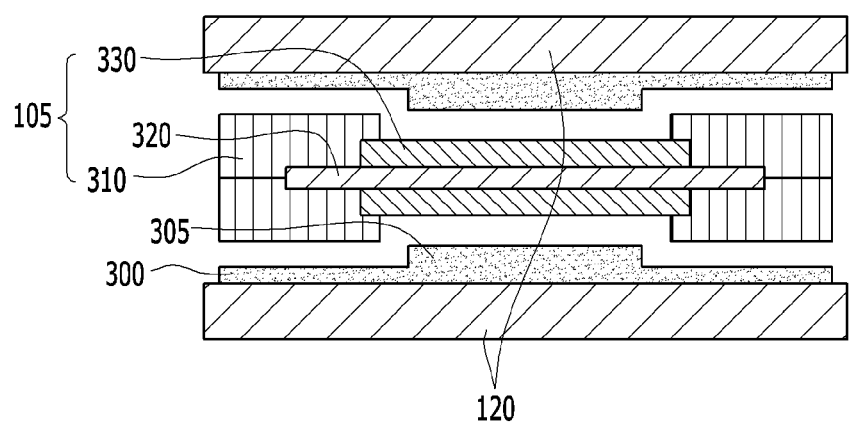
FIG. 3 is a partial cross-sectional view of the apparatus for manufacturing the fuel cell stack components according to the exemplary embodiment of the present invention.

FIG. 3 is a partial cross-sectional view of the apparatus for manufacturing the fuel cell stack components according to the exemplary embodiment of the present invention.

Referring to FIG. 3, the apparatus for manufacturing the fuel cell stack components includes first hot plates 120, soft films 300, protruding portions 305, and a membrane-electrode assembly 105, and the membrane-electrode assembly 105 includes an electrolyte membrane 320, electrodes 330, and sub-gaskets 310.

The soft film 300 is attached onto one surface of each of the first hot plates 120 so as to face the membrane-electrode assembly 105, and the protruding portions 305 are formed on the soft film 300 so as to correspond to the shape of the membrane-electrode assembly 105.

Therefore, the first hot plates 120 are hot pressed so that the protruding portions 305 are inserted into grooves of the membrane-electrode assembly 105, thereby improving precision of the hot pressing process.

In particular, in the exemplary embodiment of the present invention, even though the membrane-electrode assemblies 105 are arranged on the MEA roll 102 with non-uniform pitches, it is possible to more precisely perform the hot pressing process by changing the positions of the first and third hot plates 120 and 124 on the basis of the second hot plates 122.

Figure 4:
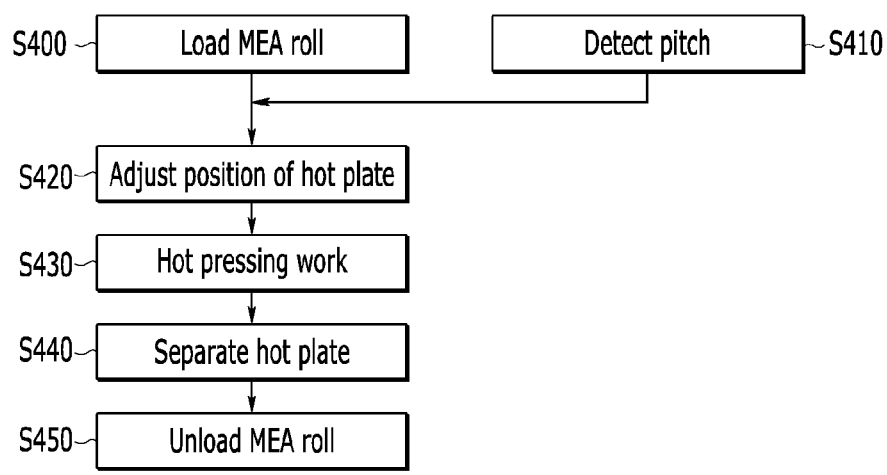
FIG. 4 is a flowchart illustrating a hot press method according to the exemplary embodiment of the present invention.

FIG. 4 is a flowchart illustrating a hot press method according to the exemplary embodiment of the present invention.

Referring to FIG. 4, in step S400, the membrane-electrode assemblies 105 are disposed between the first, second, and third hot plates 120, 122, and 124, respectively, by moving the MEA roll 102 from the unwinder roller 100 to the rewinder roller 101, and in step S410, intervals (pitches) between the membrane-electrode assemblies 105 arranged on the MEA roll 102 are detected.

Next, intervals between the first and third hot plates 120 and 124 are adjusted to correspond to the intervals between the membrane-electrode assemblies 105 which are detected in step S420, and in step S430, the hot pressing process is carried out by using the first, second, and third hot plates 120, 122, and 124.

Next, in step S440, the first, second, and third hot plates 120, 122, and 124 are separated from the membrane-electrode assemblies 105, and in step S450, the MEA roll 102 is unloaded from the first, second, and third hot plates 120, 122, and 124.

Figure 5:
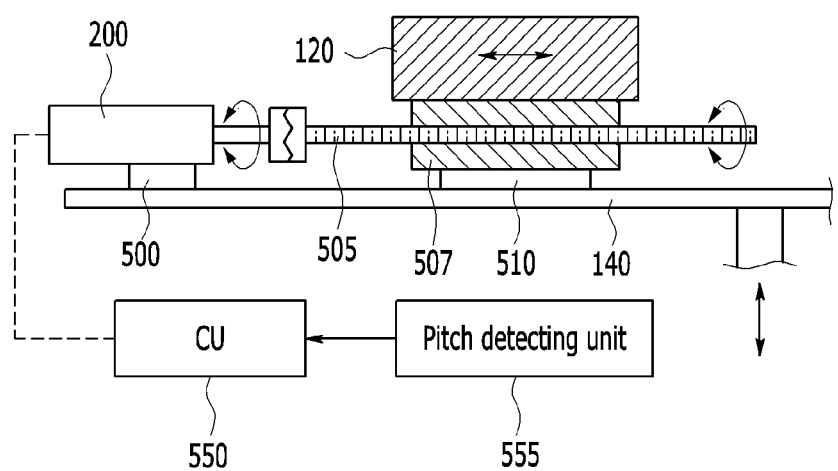
FIG. 5 is a partial cross-sectional view illustrating a structure of a pitch changing unit in the hot press method according to the exemplary embodiment of the present invention.

FIG. 5 is a partial cross-sectional view illustrating a structure of a pitch changing unit in the hot press method according to the exemplary embodiment of the present invention.

Referring to FIG. 5, the pitch changing unit includes a moving block 507 which is slidably disposed on the pressing frame 140 by means of a slider 510, and the first hot plate 120 which is fastened to the moving block 507 so as to be moved together with the moving block 507.

A screw 505 is disposed to penetrate the moving block 507, and the moving block 507 is disposed on the pressing frame 140 so as to be reciprocally moved by rotation of the screw 505.

One end of the screw 505 is connected to the first variable pitch servo motor 200, and the first variable pitch servo motor 200 is fixed to the pressing frame 140 by means of a fixed block 500.

A control unit 550 receives a pitch signal from a pitch detecting unit 555 that detects a pitch between the membrane-electrode assemblies 105, and based on the pitch signal, the first variable pitch servo motor 200 is operated to adjust the position of the first hot plate 120.

In the exemplary embodiment of the present invention, the pitch detecting unit 555 may include sensors that detect positions of the membrane-electrode assemblies 105, respectively.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A hot press method, comprising the steps of:
providing a roller around which a roll on which objects to be pressed are disposed at predetermined intervals is wound, wherein the objects to be pressed are membrane-electrode assemblies;
disposing hot plates to face one surface of the objects to be pressed that is supplied from the roller, wherein the hot plates include first, second, and third hot plates that are disposed at predetermined intervals in a direction in which the membrane-electrode assemblies are arranged;
disposing press units to push the hot plates on the objects to be pressed;
adjusting positions of the hot plates by a pitch changing unit which moves the hot plates in a direction in which the roll is moved or in a direction opposite to a direction in which the roll is moved, in accordance with a distance between the membrane-electrode assemblies;

pressing the hot plates on both surfaces of the objects to be pressed at a predetermined temperature, in accordance with an interval between the objects to be pressed, using predetermined force; and separating the hot plates pressed on the objects to be pressed, wherein a film is fixedly disposed on one surface of at least one of the first, second, and third hot plates so as to face the membrane-electrode assemblies, wherein the film has a protruding portion formed to correspond to a shape of the membrane-electrode assemblies, and wherein:

in adjusting the positions of the hot plates, the second hot plate is not movable, and the first and third hot plates are moved forward or rearward.

2. The hot press method of claim 1, wherein:
the roll is loaded between the hot plates.

3. The hot press method of claim 1, wherein:
the roll is a membrane-electrode assembly roll.

* * * * *